June 9, 1931. A. G. ENOCK 1,809,163
APPARATUS FOR AUTOMATICALLY MEASURING AND
DELIVERING MILK OR OTHER LIQUIDS
Filed Jan. 2, 1929 4 Sheets-Sheet 2
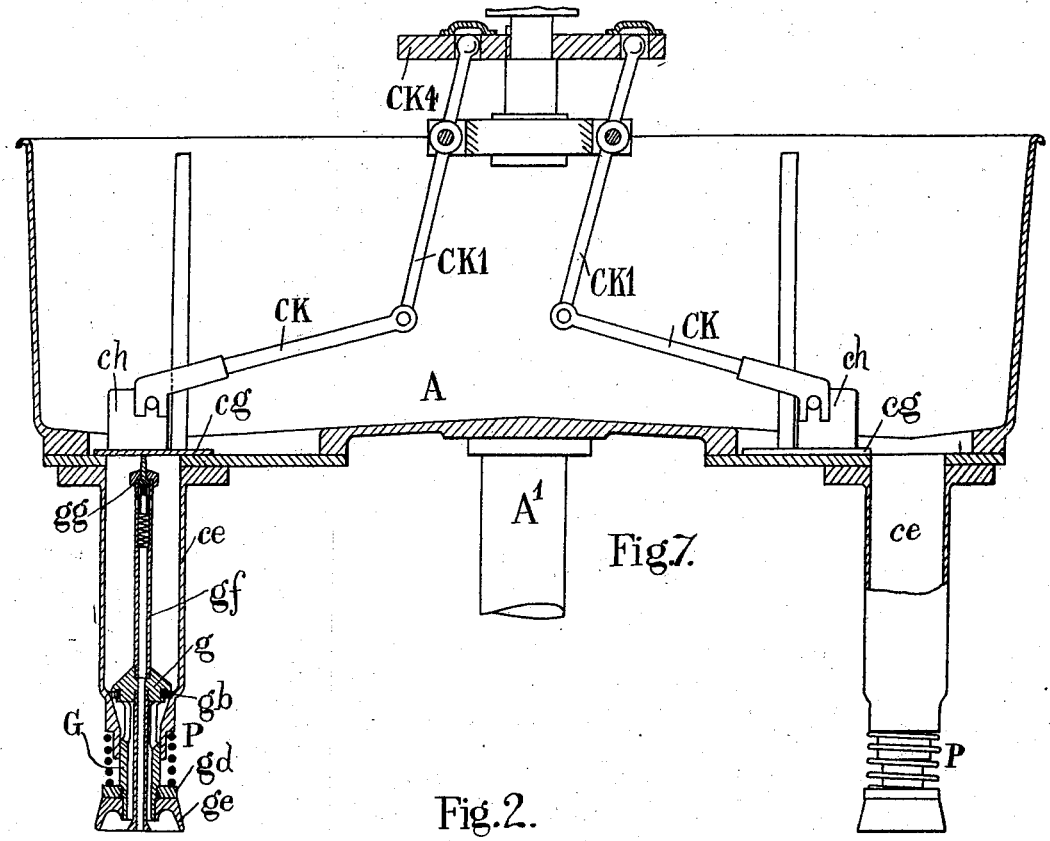
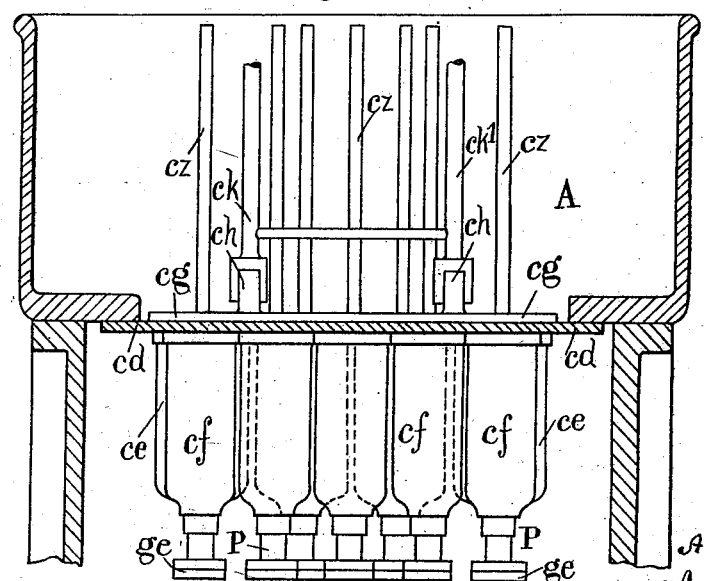
INVENTOR
A. G. Enock
BY
ATTORNEY June 9, 1931.  A. G. ENOCK  1,809,163
APPARATUS FOR AUTOMATICALLY MEASURING AND
DELIVERING MILK OR OTHER LIQUIDS
Filed Jan. 2, 1929  4 Sheets-Sheet 3

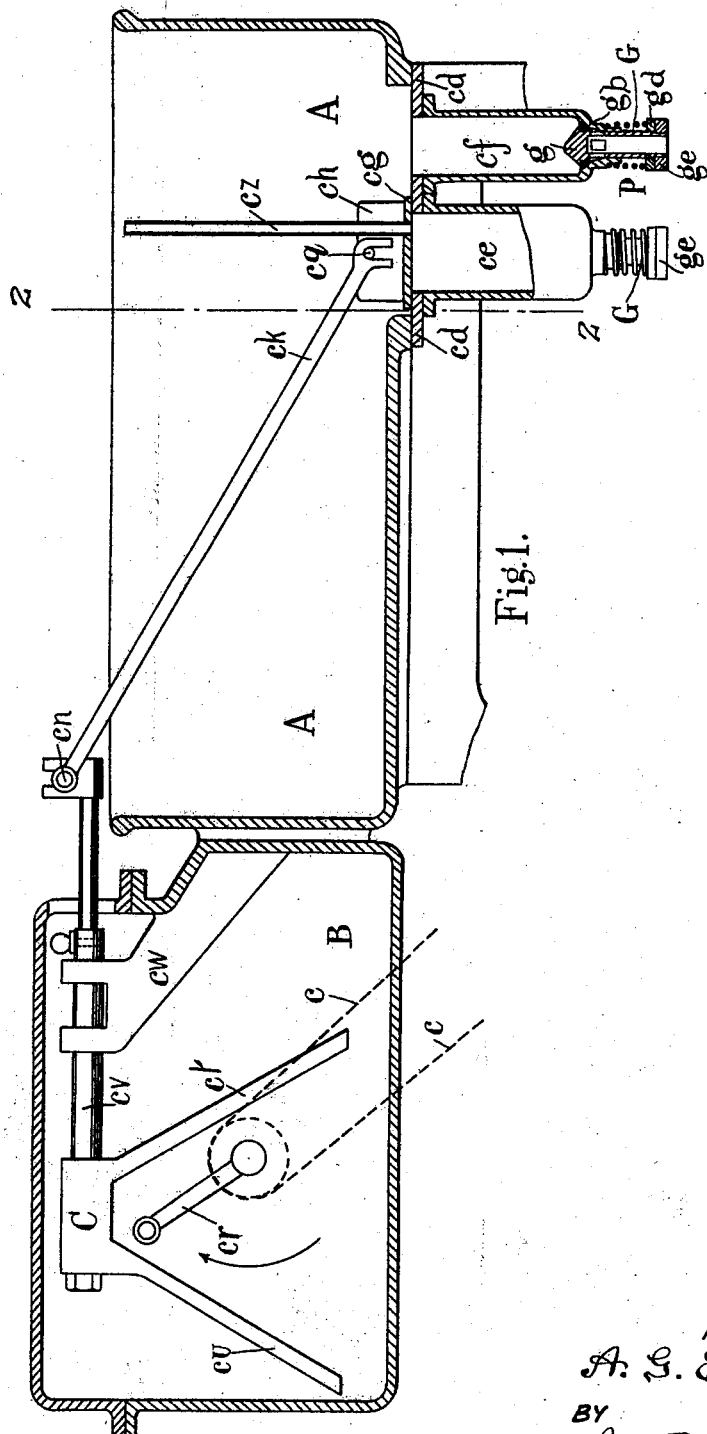

INVENTOR
A. G. Enock.
BY
Jowden O'Brien
ATTORNEY

June 9, 1931.  A. G. ENOCK  1,809,163
APPARATUS FOR AUTOMATICALLY MEASURING AND
DELIVERING MILK OR OTHER LIQUIDS
Filed Jan. 2, 1929   4 Sheets-Sheet 4

INVENTOR
A. G. Enock
BY
ATTORNEY

Patented June 9, 1931

1,809,163

UNITED STATES PATENT OFFICE

ARTHUR GUY ENOCK, OF WEMBLEY PARK, ENGLAND, ASSIGNOR TO BURLECTAS LIMITED, OF LONDON, ENGLAND

APPARATUS FOR AUTOMATICALLY MEASURING AND DELIVERING MILK OR OTHER LIQUIDS

Application filed January 2, 1929, Serial No. 329,731, and in Great Britain January 13, 1928.

The invention relates to apparatus for automatically measuring and delivering milk or other liquid into bottles or the like of the type in which the measures are fitted beneath a containing vessel or bowl and are each controlled and permitted to fill by an independent and positively operated inlet valve and are subsequently permitted to empty, by the pressure of the bottle mouth opening the outlet valve or engaging the mechanism of valves by which the liquid is discharged from the measure.

The object of the invention is to provide measuring appliances which will operate correctly irrespective of the liquid level in the container or milk bowl, and to provide means for the very rapid discharge of the measures, and the evacuation of the air and resulting froth from the tops of the bottles in the measure as the latter empties.

According to the invention the measures which depend vertically from the bottom of the container or bowl, are constructed open at the top to their full area directly into the body of the container and are fitted with horizontally operating inlet slide valves which slide on the bottom of the container over the open tops of the measures and completely shut off each measure when filled from the residual liquid in the bowl, and also with outlet valves or cocks to operate on the rising of the bottle after the inlet valves have been closed, to rapidly discharge the milk or liquid into the bottles, and to evacuate the air in the bottles.

The invention will be fully described with reference to the accompanying drawings:—

Fig. 1 is a longitudinal section through the container showing the measures suspended therefrom with slide valve inlet and poppet valve outlet with two sizes of measures.

Fig. 2 is a transverse section on line 2—2 of Fig. 1.

Fig. 7 is a longitudinal section showing a rotary machine with slide valve inlet and poppet valve outlet.

Figure 3:
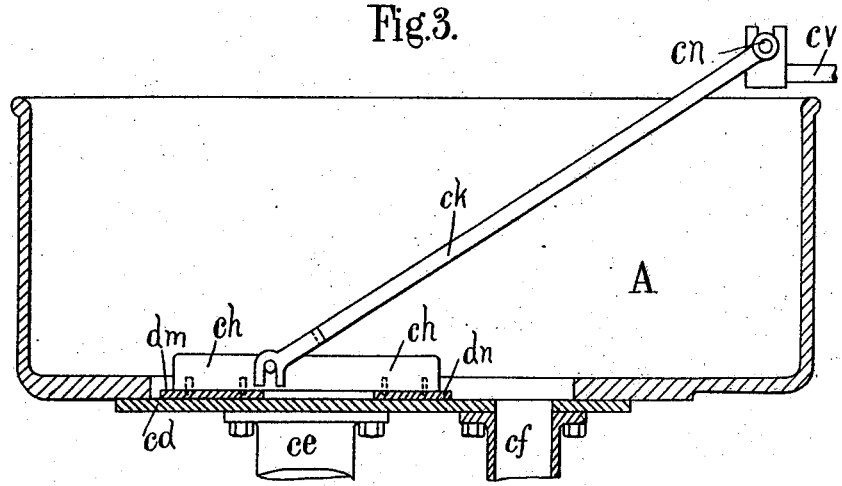
Figs 3 and 4 are longitudinal section and plan showing a modified construction of the inlet slide valve.

In carrying out the invention the bowl or container A for the liquid is of any convenient or known size or construction beneath which one or more measures $ce$, $cf$ are bolted each directly open at top for its full area to the container and controlled by a slide valve inlet $dm$, $dn$ and a poppet valve outlet P, the inlet and outlet valves being positively and independently opened and closed.

The bowl or container A may be fitted with a single measure for filling single bottles separately, or with one or more rows of measures $ce$ of the same capacity for filling one or more rows of bottles in a crate simultaneously or with two rows of measures of different capacities such as $ce$ for quarts and $cf$ for pints either of which row can be used without the other. The measures are vertical with the inlet valve at the top and the outlet valve at the bottom and preferably bolted to a valve plate $cd$ bolted to the underside of the container A.

The bottles are raised to the measures by known mechanism or by apparatus such as described in British specification No. 295,666 dated May 16, 1927 and Serial No. 272,481 filed April 24, 1928.

In the form shown in Figs. 1 and 2 two measures $ce$ and $cf$ of larger and smaller capacities are shown bolted to the valve plate $cd$ and above the valve plate a longitudinally reciprocating slide valve $cg$ is fitted to move to and fro over the inlets into both measures $ce$ and $cf$. The valve $cg$ is held to its seat by a weight $ch$ and moved to and fro by connecting rods, $ck$, $ck^1$ pivoted to a transverse spindle $cn$ so fitted as to be easily removed for cleaning. The valve $cg$ is intermittently operated from or synchronized with the mechanism by which the bottles are lowered or raised to the filling nozzles.

This mechanism comprises a crank $cr$ continuously driven by a chain $c$ and a forked bracket C with which the crank engages, mounted on a sliding bar *cv* linked with the connecting rods *ck* and *ck¹* of the sliding valve *cg* by the spindle *cn*. The fork bracket C and crank are preferably mounted in an oil bath B the bar *cv* sliding in a bracket *cw* integral with or bolted to the wall of the oil bath B. When using the smaller measure *cf* the crank is rotated in the direction of the arrow Fig 1 and is reversed when using the larger measure *ce* for the reason referred to hereafter. The crank *cr* as it rotates engages the arms *cu* and *ct* of the bracket C alternately moving the valve to and fro, completely uncovering and leaving the apertures to the measures completely open to the liquid in the bowl A. Owing to the angle of the arms on the bracket, the valve remains stationary for a longer period when the measure is closed by it then when open allowing the longer period for the measure to empty and to fill the bottle for which reason the direction of rotation of the crank *cr* is reversed when using the larger measure *ce* from that when using the smaller measure. A snift pipe *cz* is fitted to the valve *cg* and extends above the liquor in the container A to admit air to the measure as the liquor flows out into the bottle.

Figure 4:
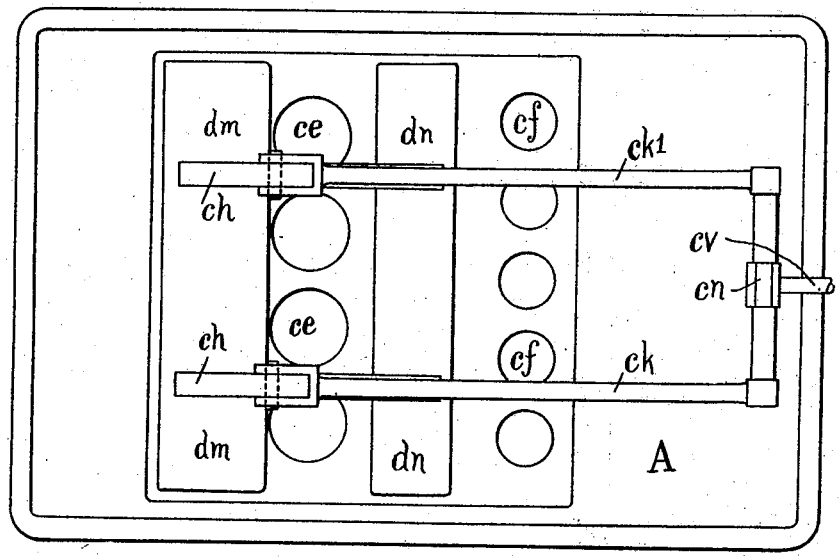

In the form shown in Figs. 3 and 4 the measures *ce* and *cf* are each controlled by a separate slide valve the larger measure *ce* by the valve *dm* and the smaller measure *cf* by the valve *dn* both held to the seats by the weight *ch* and reciprocated together.

They are operated by mechanism comprising the forked bracket C and crank *cr* similar to that described with reference to Fig. 1, but it will not require reversing to change from filling larger bottles to filling smaller bottles it being only necessary to change the lifting motion of the tables which raise the bottles.

Figure 5:
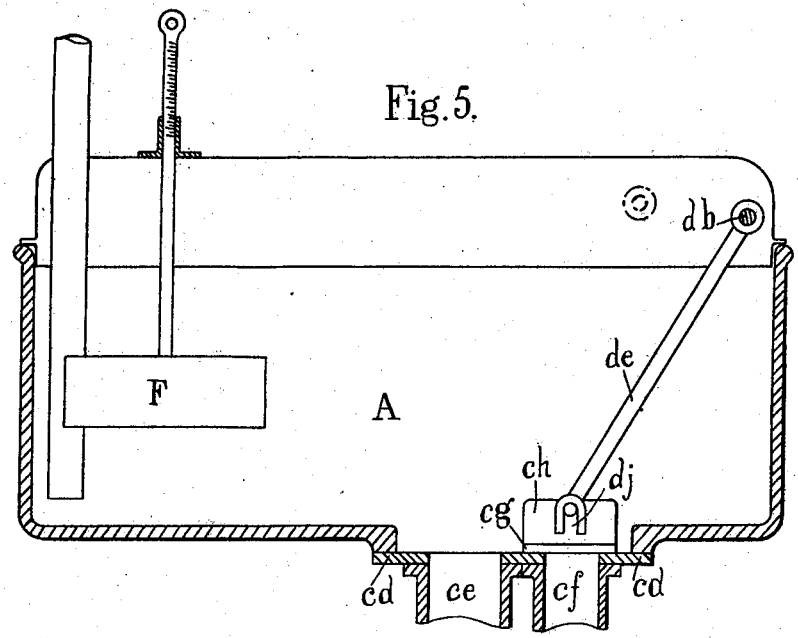
Figs. 5 and 6 are longitudinal section and side elevation of another modification of the inlet slide valve.
Figure 6:
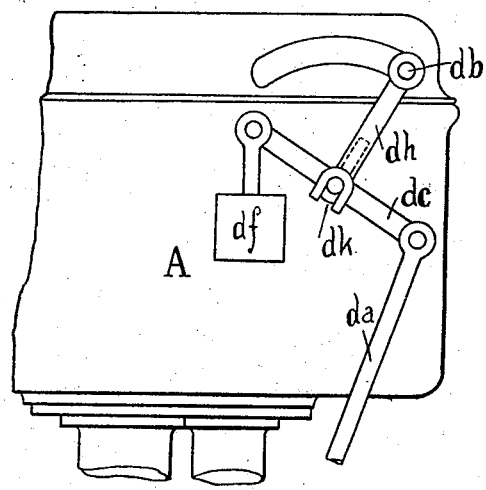

In the form shown in Figs. 5 and 6 the slide valve *cg* over the inlet to the measures *ce* and *cf* is similar to that shown in Fig. 1 reciprocated by a lever *de*. The slide valve operating mechanism is placed at the side of the container A and is drawn from below through a rod *da* by the intermittent motion mechanism comprising the forked bracket C and crank *cr* shown in Fig. 1. In this construction a cranked lever *dc*, *dh* is pivoted at *dk* and the connecting rod *da* is raised and lowered, thereby moving the transverse spindle *db* bodily thereby reciprocating the sliding valve *cg* by the rod *de*. The mechanism is balanced by the weight *df*. The lever *dh* and the rod *de* are forked or slotted at *dk* and *dj* to facilitate easy removal for cleaning.

The container A is shown with a cover and is provided with a float F to indicate the level of the milk therein.

In the form shown in Fig. 7 the invention is applied to a rotary filling head with a number of measures *ce* of equal capacity adapted to fill bottles singly in rotation. The container A to which the measures are bolted is mounted on a central pillar A' and over each measure the slide valve *cg* reciprocates to move backward to fill the measure and to move forward to close the measure as it approaches the position to fill the bottle. Each slide valve *cg* is fitted as previously described with reference to Fig. 1 and motion is imparted to them by a stationary cam $CK^4$ through the lever $CK^1$ and connecting rod CK. Each valve is fitted with a vent pipe.

Each measure *ce*, *cf* is fitted at its lower end with an outlet or discharge valve which is opened to fill the bottle after the inlet slide valve has closed, either by contact with the bottle mouth or by a connection with the bottle table.

As shown in Figs. 1 to 7 an outlet poppet valve P is preferred. The poppet valve P is of known construction and comprises a tubular discharge member G fitted with a valve *g* engaging with a rubber seat *gb*, a screwed abutment collar *gd* at its lower end against which a spring presses to close the valve and a rubber ring *ge* against which the bottle mouth contacts to raise and open the valve *g*. The valve may be fitted with a rod or tube *gf* projecting upwards into the measure which may be readily machined in order to obtain exact measure and also provided for easy removal of the valve. When tubular as in Fig. 7 it acts as a snift pipe to induce quicker flow of air and froth from the empty bottle, the snift pipe being provided with a non-return valve *gg* of known construction to prevent leakage of liquid while filling the measure.

A float F may be placed in the container or milk bowl A to control the flow of milk from the milk treatment plant and to arrest the flow of milk therefrom should the level of milk in the container of bowl rise to too high a level.

This construction of the measure bolted to the underside of the container A and directly open for its full area to the body of the container acts independently of the level of the liquid in the container and permits as it fills all froth and air bubbles to rise and mingle with the milk in the container. And for cleaning purposes when the valves are removed each measure presents a perfectly clear barrel open at both ends thereof through which a brush or cloth can be passed for cleaning.

What I claim as my invention and desire to protect by Letters Patent is:—

1. A machine for filling bottles with a measured quantity of liquid comprising a bulk container, a plurality of measures open at the top fitted to the bottom of and opening for their full area directly into the body of the container, a horizontally operating inlet slide valve adapted to slide to and fro over the tops of the measures, air escape pipes mounted on the slide valve, two connecting rods controlling the slide valve, a sliding bar coupled to the connecting rods, a forked bracket on the sliding bar and a crank to reciprocate the sliding bar to and fro, and outlet valves at the lower end of the measures to operate on the rising of the bottles after the inlet valve has closed to rapidly discharge the liquid into the bottles and evacuate air from the bottles.

2. A machine for filling bottles with a measured quantity of liquid comprising a bulk container, a series of measures open at the top fitted to the bottom of and opening for their full area directly into the body of the container, a second series of measures of differing capacity from the first series also open at the top, fitted to the bottom of and opening for their full area directly into the body of the container, a horizontally operating inlet slide valve adapted to slide to and fro over the tops of the measures, air escape pipes mounted on the slide valve, two connecting rods controlling the slide valves, a sliding bar coupled to the connecting rods, a forked bracket on the sliding bar and a crank to reciprocate the sliding bar to and fro, and outlet valves at the lower end of the measures to operate on the rising of the bottles after the inlet valve has closed to rapidly discharge the liquid into the bottles and evacuate air from the bottles.

In testimony whereof I have hereunto set my hand this 11th day of December, 1928.

ARTHUR GUY ENOCK.